United States Patent
Lee

[11] Patent Number: 6,092,844
[45] Date of Patent: Jul. 25, 2000

[54] PIPE COUPLER

[76] Inventor: Do Yean Lee, 1158-20, Cheki 2 Dong, Tongdaemoon-Ku, Seoul, Rep. of Korea

[21] Appl. No.: 09/183,560

[22] Filed: Oct. 30, 1998

[30] Foreign Application Priority Data

Aug. 14, 1998 [KR] Rep. of Korea ................. 98-33031

[51] Int. Cl.[7] .................................................. F16L 55/00
[52] U.S. Cl. ................. 285/90; 285/133.21; 285/179; 285/360
[58] Field of Search ................... 285/93, 90, 179, 285/133.21, 360, 361

[56] References Cited

U.S. PATENT DOCUMENTS

| | | | |
|---|---|---|---|
| 74,950 | 2/1868 | Steger | 285/90 |
| 1,167,832 | 1/1916 | Martin | 285/93 |
| 2,230,098 | 1/1941 | Wurzburger | 285/90 |
| 2,926,028 | 2/1960 | Hookings et al. | 285/90 |
| 2,943,869 | 7/1960 | Nordin | 285/93 X |
| 3,201,149 | 8/1965 | Bragg | 285/93 X |
| 3,715,135 | 2/1973 | Paddington | 285/90 X |
| 4,930,816 | 6/1990 | Yih | 285/179 X |

FOREIGN PATENT DOCUMENTS 4331887  11/1992  Japan .......................................... 285/90

*Primary Examiner*—Dave W. Arola
*Attorney, Agent, or Firm*—Klauber & Jackson

[57] ABSTRACT

A pipe coupler for connecting pipes together is disclosed. The pipe coupler includes a cylindrical socket. A pair of insertion grooves are formed inside the socket, and each of a pair of packings is inserted into each of the insertion grooves to seal off connecting portions of two pipes. A plurality of withdrawing paths are formed inside both end portions of the socket, and a pair of binding grooves respectively communicate to the pluralities of the withdrawing paths. A plurality of protuberances are formed on each of the connecting portions of the two pipes correspondingly to the plurality of the withdrawing paths, for being inserted into the plurality of the withdrawing paths. The connecting portions of the two pipes are slightly rotated after entering into the socket so as to make the protuberances disposed within the binding grooves and between the withdrawing paths. A pair of bolt holes are formed in the socket, for receiving bolts to fix the socket to the connecting portions of the two pipes, whereby a pipe connection is securely maintained.

5 Claims, 5 Drawing Sheets

PIPE COUPLER

BACKGROUND OF THE INVENTION

1. Field of the Invention

The present invention relates to a pipe coupler for connecting pipes together. More specifically, the present invention relates to a pipe coupler in which a socket shaped coupler for receiving protuberances is used, thereby making the connection of pipes more convenient.

2. Description of the Prior Art

In the conventional pipe connections, mostly two semi-circular type upper and lower couplers are used, and they are fastened with bolts and nuts. Therefore, when the connection of pipes is carried out, the horizontal straightness cannot be easily attained. As a result, the connection of pipes was difficult, and the connecting time was extended.

SUMMARY OF THE INVENTION

The present invention is intended to overcome the above described disadvantages of the conventional technique.

Therefore it is an object of the present invention to provide a pipe coupler in which a socket shaped coupler for receiving protuberances is used, thereby making the connection of pipes more convenient.

In achieving the above object, the pipe coupler according to the present invention includes: a cylindrical socket; a pair of insertion grooves formed inside the socket; a pair of packings each inserted into each of the insertion grooves to seal off connecting portions of two pipes; a plurality of withdrawing paths formed inside both end portions of the socket; a pair of binding grooves communicating to the pluralities of the withdrawing paths; a plurality of protuberances formed on each of the connecting portions of the two pipes correspondingly to the plurality of the withdrawing paths, for being inserted into the plurality of the withdrawing paths; the connecting portions of the two pipes being slightly rotated after entering into the socket so as to make the protuberances disposed within the binding grooves and between the withdrawing paths; and a pair of bolt holes formed in the socket, for receiving bolts to fix the socket to the connecting portions of the two pipes, whereby a pipe connection is securely maintained.

BRIEF DESCRIPTION OF THE DRAWINGS

The above object and other advantages of the present invention will become more apparent by describing in detail the preferred embodiment of the present invention with reference to the attached drawings in which:

FIG. 2b is a sectional view taken along a line A—A of FIG. 2a;

FIG. 4b is a sectional view taken along a line B—B of FIG. 4a; and

DETAILED DESCRIPTION OF THE PREFERRED EMBODIMENTS

Figure 1:
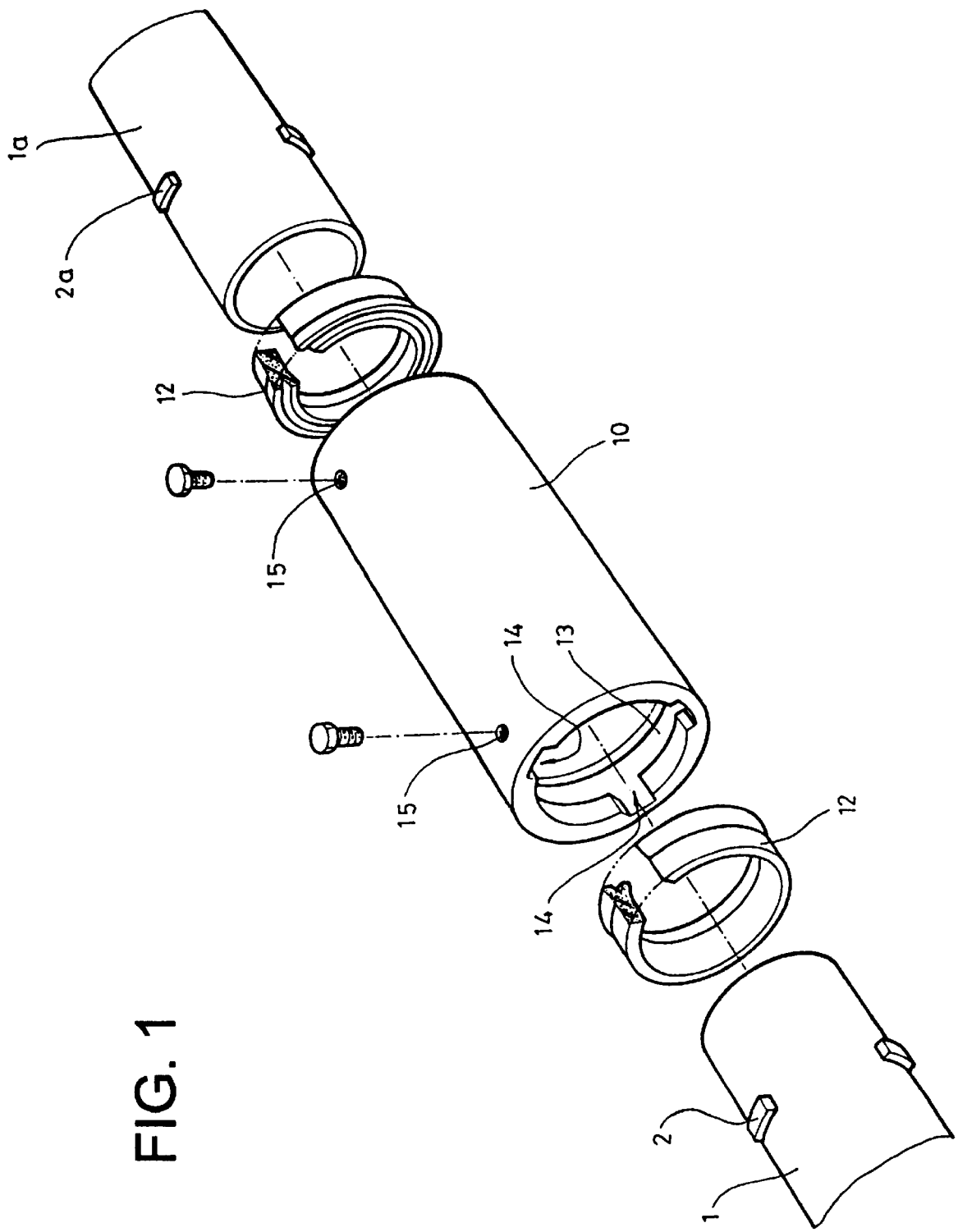
FIG. 1 is an exploded perspective view of the pipe coupler according to the present invention.
Figure 2A:
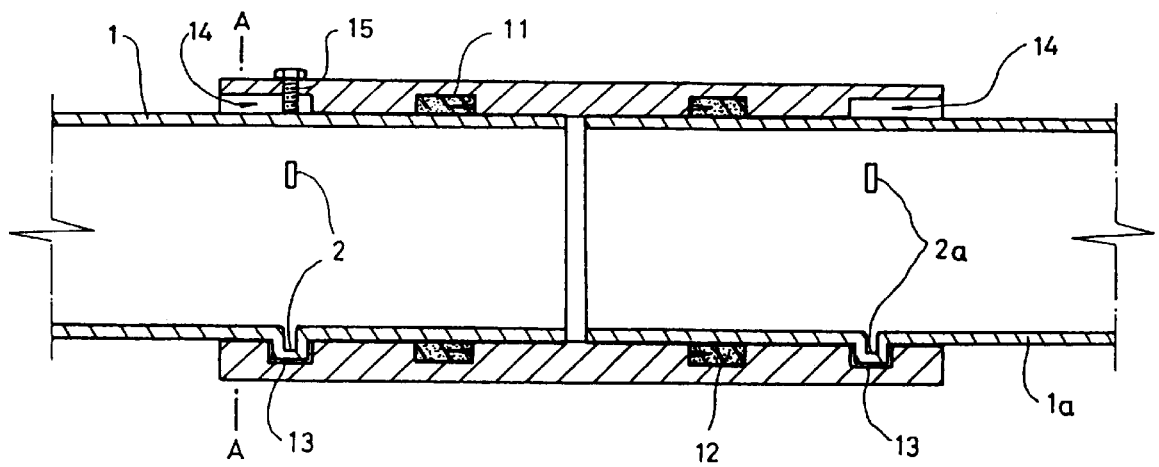
FIG. 2a is a longitudinal sectional view showing the assembled state of two pipes.
Figure 2B:
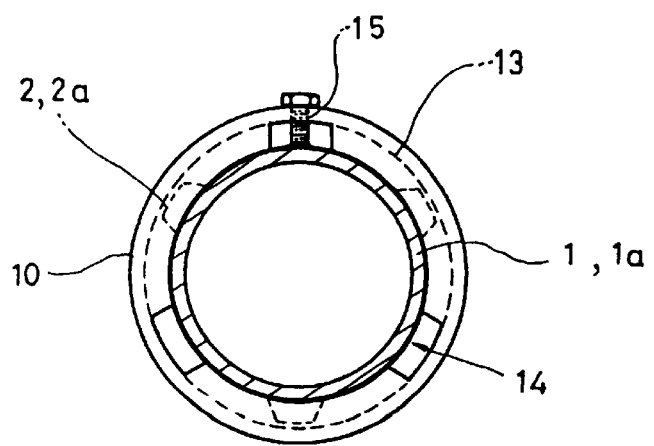
Figure 3:
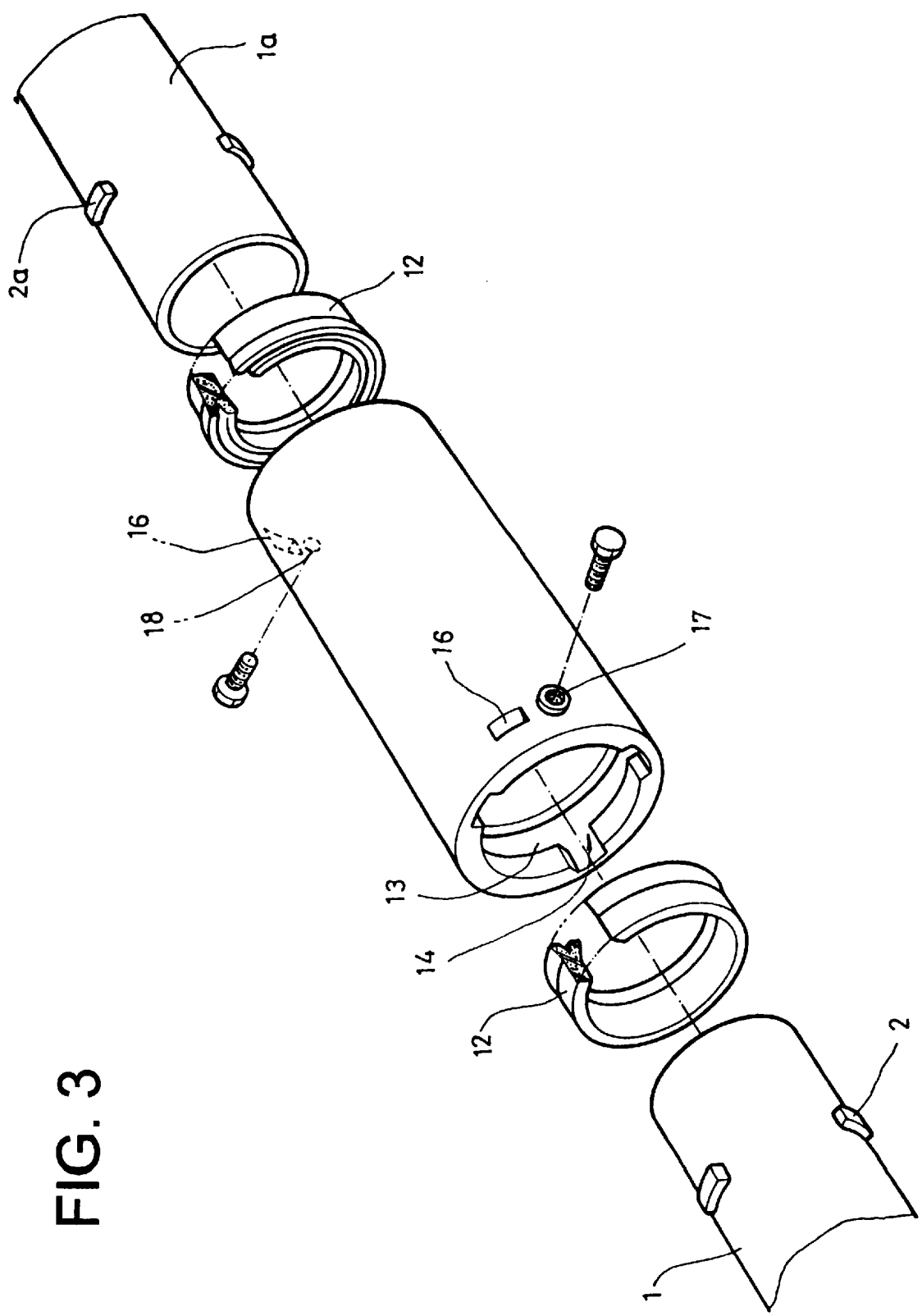
FIG. 3 is an exploded perspective view of another embodiment of the pipe coupler of the present invention in which the two bolts are fastened in the opposite direction.
Figure 4A:
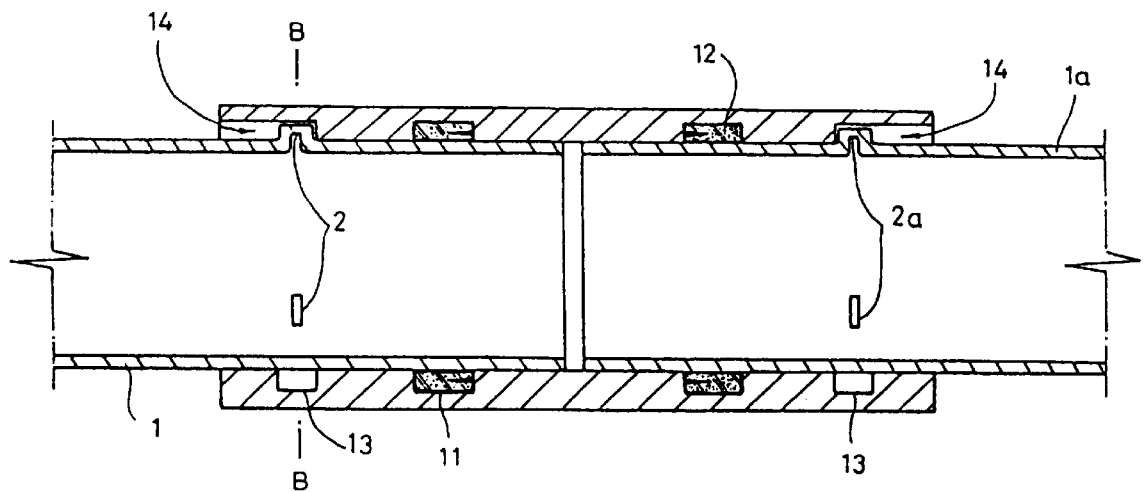
FIG. 4a is a longitudinal sectional view showing the assembled state of the two pipes of FIG. 3.
Figure 4B:
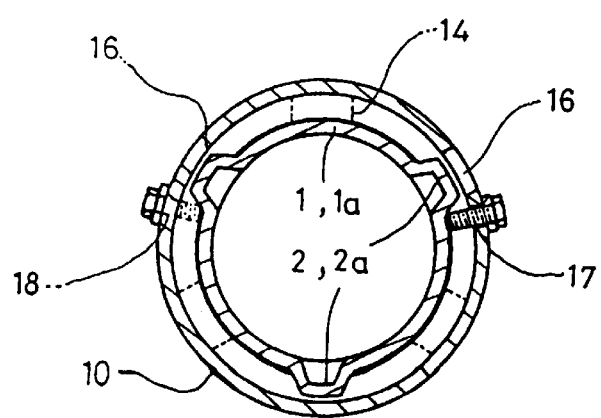
Figure 5A:
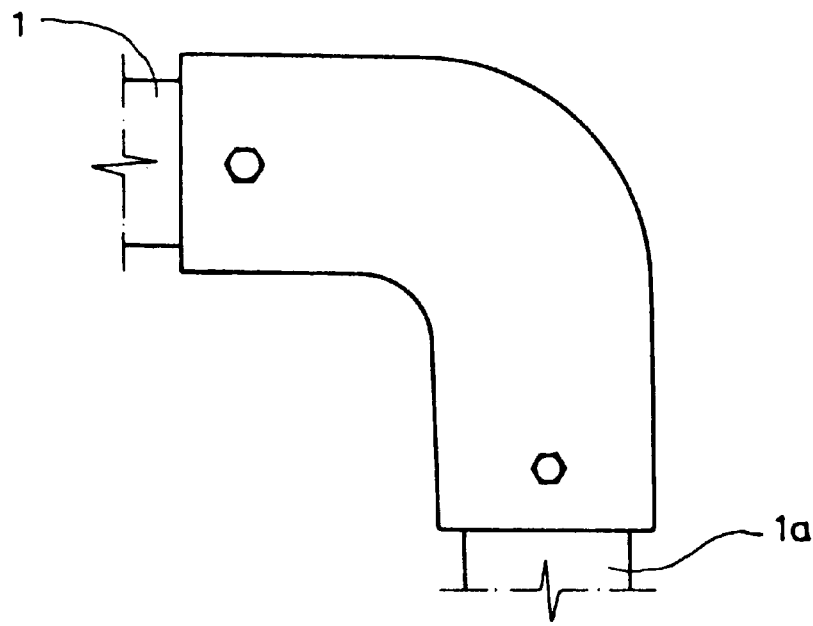
FIGS. 5a and 5b respectively illustrate an L shaped socket and a T shaped socket.
Figure 5B:
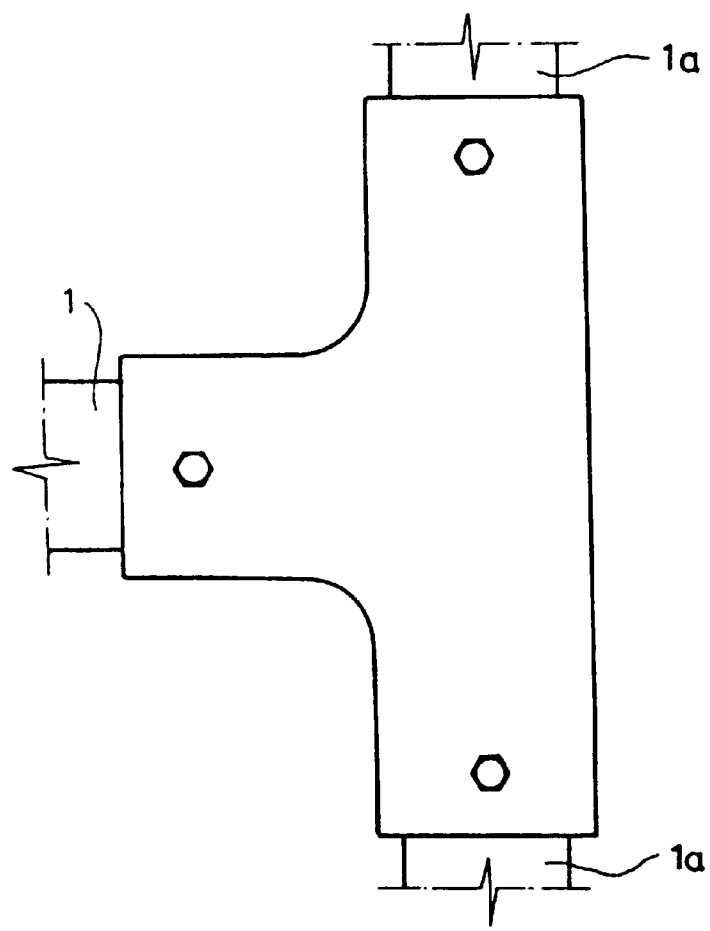

The pipe coupler according to the present invention includes: a cylindrical socket 10; a pair of insertion grooves 11 formed inside the socket 10; a pair of packings 12 each inserted into each of the insertion grooves 11 to seal off connecting portions of two pipes 1 and 1a; a plurality of withdrawing paths 14 formed inside both end portions of the socket 10; a pair of binding grooves 13 communicating to the pluralities of the withdrawing paths 14; a plurality of protuberances 2 and 2a formed on each of the connecting portions of the two pipes correspondingly to the plurality of the withdrawing paths 14, for being inserted into the plurality of the withdrawing paths 14; the connecting portions of the two pipes 1 and 1a being slightly rotated after entering into the socket 10 so as to make the protuberances 2 and 2a disposed within the binding grooves and between the withdrawing paths 14; and a pair of bolt holes 15 formed in the socket 10, for receiving bolts to fix the socket 10 to the connecting portions of the two pipes 1 and 1a, whereby a pipe connection is securely maintained.

In another embodiment, a see-through window 16 is formed on the binding groove 13 and between the withdrawing paths 14, so that the position of the protuberance 2 or 2a can be confirmed. Further, two bolt holes 17 and 18 are formed in the opposite directions, so that bolts can be fastened from the opposite directions.

In still other embodiments, the socket 10 is of an L shaped form and a T shaped form, so that they can be used in proper cases.

According to the present invention, the pipe coupler includes a cylindrical socket 10. A pair of insertion grooves 11 are formed inside the socket 10, and each of a pair of packings 12 is inserted into each of the insertion grooves 11 to seal off connecting portions of two pipes 1 and 1a. A plurality of withdrawing paths 14 are formed inside both end portions of the socket 10, and a pair of binding grooves 13 respectively communicate to the pluralities of the withdrawing paths 14. A plurality of protuberances 2 and 2a are formed on each of the connecting portions of the two pipes correspondingly to the plurality of the withdrawing paths 14, for being inserted into the plurality of the withdrawing paths 14. The connecting portions of the two pipes 1 and 1a are slightly rotated after entering into the socket 10 so as to make the protuberances 2 and 2a disposed within the binding grooves and between the withdrawing paths 14. A pair of bolt holes 15 are formed in the socket 10, for receiving bolts to fix the socket 10 to the connecting portions of the two pipes 1 and 1a, whereby a pipe connection is securely maintained.

What is claimed is:

1. A pipe coupler comprising:
   a cylindrical socket 10 comprising: a pair of annular insertion grooves 11 formed inside said socket 10; a plurality of withdrawing paths 14 formed inside both end portions of said socket 10; and a pair of annular binding grooves 13, one each being respectively formed inside said socket 10 at each end thereof and extending entirely around the inside wall of said socket 10, each said groove being intersected by and communicating with the pluralities of said withdrawing paths 14;
   a pair of packings 12 each inserted into each of said annular insertion grooves 11 of said socket 10 to seal off connecting portions of two pipes 1 and 1a;
   a plurality of protuberances 2 and 2a formed on each of said connecting portions of said two pipes correspondingly to the plurality of said withdrawing paths 14, for being inserted into the plurality of said withdrawing paths 14;

said connecting portions of said two pipes 1 and 1*a* being slightly rotated after entering into said socket 10 so as to make said protuberances 2 and 2*a* disposed within said annular binding grooves and between said withdrawing paths 14; and a pair of bolt holes 15 formed in said socket 10, for receiving bolts to prevent said protuberances from entering said withdrawing paths to fix said socket 10 to said connecting portions of said two pipes 1 and 1*a*, whereby a pipe connection is securely maintained.

2. The pipe coupler as claimed in claim 1, wherein a see-through window 16 is formed between said binding groove 13 and the outer wall of said socket 10 at a position between said withdrawing paths 14 of said socket 10, to enable a determination that a protuberance 2, 2*a* is properly positioned between withdrawing paths 14.

3. The pipe coupler as claimed in claim 1, wherein two bolt holes 17 and 18 are formed in opposite directions to fasten bolts from opposite directions so as to fix said connecting portions of said pipes 1 and 1*a* after moving said protuberances 2 and 2*a* to between said withdrawing paths 14 within said annular binding grooves 13 of said socket 10.

4. The pipe coupler as claimed in claim 1, wherein said socket 10 is L-shaped.

5. The pipe coupler as claimed in claim 1, wherein said socket 10 is T-shaped.

* * * * *